(12) United States Patent
Geskes et al.

(10) Patent No.: US 7,866,305 B2
(45) Date of Patent: Jan. 11, 2011

(54) FLOW CHANNEL, HEAT EXCHANGER, EXHAUST GAS RECIRCULATION SYSTEM, CHARGE AIR SUPPLY SYSTEM, USE OF A HEAT EXCHANGER

(75) Inventors: Peter Geskes, Ostfildern (DE); Juergen Barwig, Stuttgart-Vaihingen (DE); Jens Ruckwied, Stuttgart (DE); Tobias Fetzer, Ostfildern (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 12/560,794

(22) Filed: Sep. 16, 2009

(65) Prior Publication Data
US 2010/0071675 A1 Mar. 25, 2010

Related U.S. Application Data

(63) Continuation of application No. PCT/EP2008/002111, filed on Mar. 17, 2008.

(30) Foreign Application Priority Data
Mar. 16, 2007 (DE) .................. 10 2007 013 301

(51) Int. Cl.
*F02B 47/08* (2006.01)
*F02B 47/00* (2006.01)

(52) U.S. Cl. ................................. 123/568.12

(58) Field of Classification Search ............ 123/568.12, 123/568.11; 165/86, 104.28, 164
See application file for complete search history.

(56) References Cited

U.S. PATENT DOCUMENTS

| 3,486,489 A | 12/1969 | Huggins |
| 3,596,495 A | 8/1971 | Huggins |
| 5,184,672 A | 2/1993 | Aoki |
| 6,161,528 A * | 12/2000 | Akao et al. ............. 123/568.12 |
| 6,394,176 B1 * | 5/2002 | Marsais ....................... 165/140 |
| 2005/0061488 A1 | 3/2005 | Yu et al. |
| 2005/0161203 A1 * | 7/2005 | Fang et al. ................... 165/140 |
| 2006/0076125 A1 * | 4/2006 | Fang et al. ................... 165/140 |

FOREIGN PATENT DOCUMENTS

| CH | 134861 | 8/1929 |
| DE | 36 15 300 A1 | 11/1987 |
| DE | 37 31 669 A1 | 4/1989 |

(Continued)

*Primary Examiner*—Mahmoud Gimie
(74) *Attorney, Agent, or Firm*—Muncy, Geissler, Olds & Lowe, PLLC

(57) ABSTRACT

A flow channel for a heat exchanger for exchanging heat between a first fluid and a second fluid, the flow channel having, perpendicular to a flow channel axis, a cross-section that can be traversed, the flow channel providing for an improved transfer of heat with an acceptable drop of pressure and a reduced risk of blocking. The flow channel has a hydraulic diameter, defined as quadruple the ratio between the surface of the cross-section that is traversed and the perimeter that can be moistened by the fluid, of between 1.5 mm and 6 mm. Also a heat exchanger having a plurality of flow channels of this type, through which the first fluid flows and fluidically connected by a fluid connection. Also a charge-air system and an exhaust gas recycling system having such flow channels.

32 Claims, 13 Drawing Sheets

FOREIGN PATENT DOCUMENTS

| | | |
|---|---|---|
| DE | 94 06 559.4 | 8/1994 |
| DE | 297 00 927 U1 | 5/1997 |
| DE | 198 48 564 A1 | 5/1999 |
| DE | 199 07 163 A1 | 10/1999 |
| DE | 202 05 200 U1 | 9/2002 |
| DE | 102 18 094 A1 | 6/2003 |
| DE | 102 25 812 C1 | 8/2003 |
| DE | 10 2004 046 604 A1 | 4/2005 |
| DE | 10 2004 050 567 A1 | 6/2005 |
| DE | 10 2005 042 908 A1 | 4/2006 |
| DE | 10 2005 016 540 A1 | 10/2006 |
| DE | 10 2007 044 980 A1 | 3/2008 |
| WO | WO 2006/040053 A1 | 4/2006 |
| WO | WO 2008/058734 A1 | 5/2008 |

* cited by examiner

A: unfouled (low-pressure exhaust gas recirculation or charge air cooling)

B: fouled high-pressure exhaust gas recirculation

Range of high fouling $$d_h = 4 \cdot \frac{\text{Flow area}}{\text{Wetted periphery}}$$

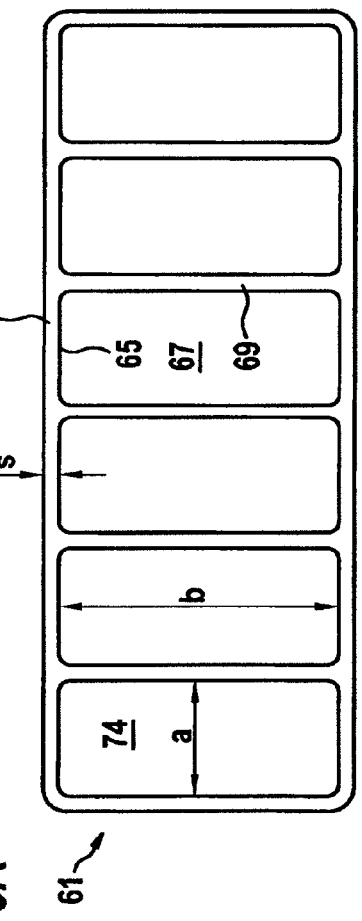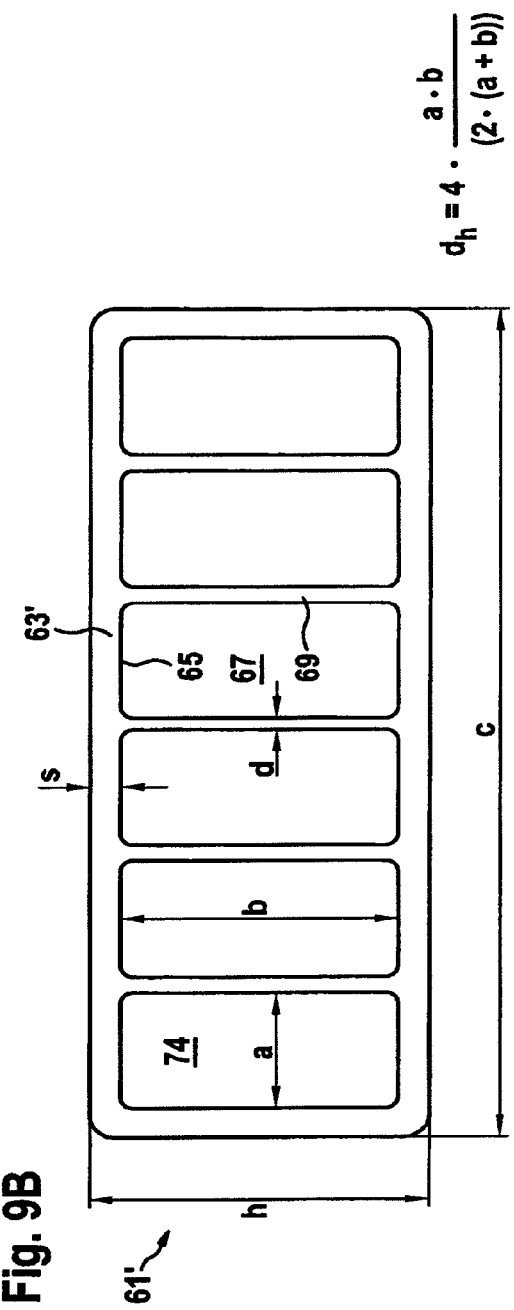
Fig. 9A
Fig. 9B
$$d_h = 4 \cdot \frac{a \cdot b}{(2 \cdot (a+b))}$$

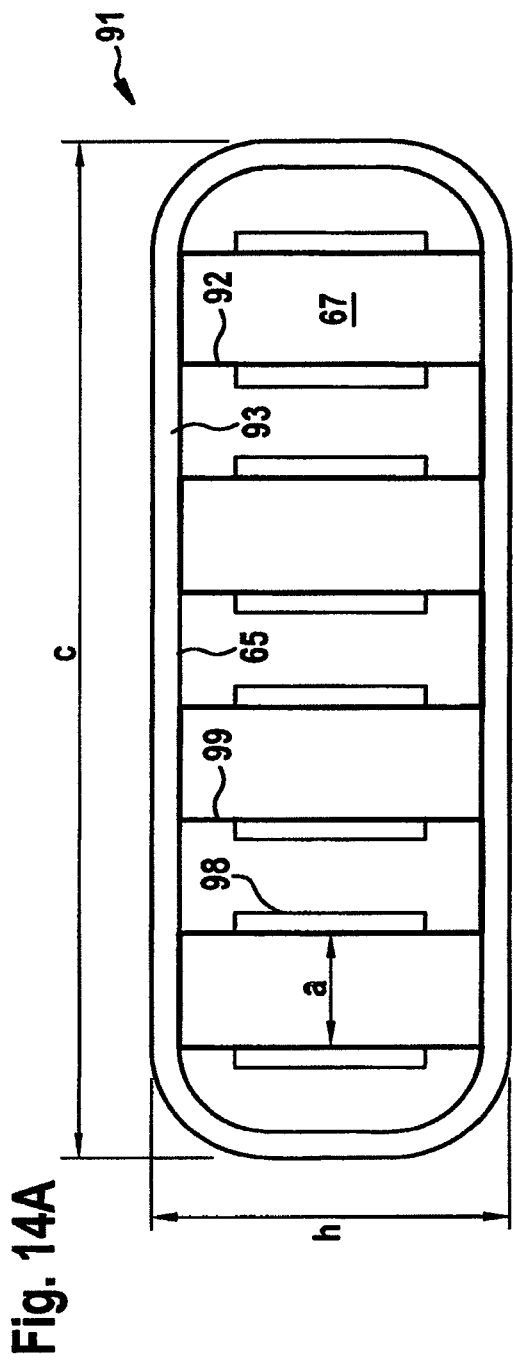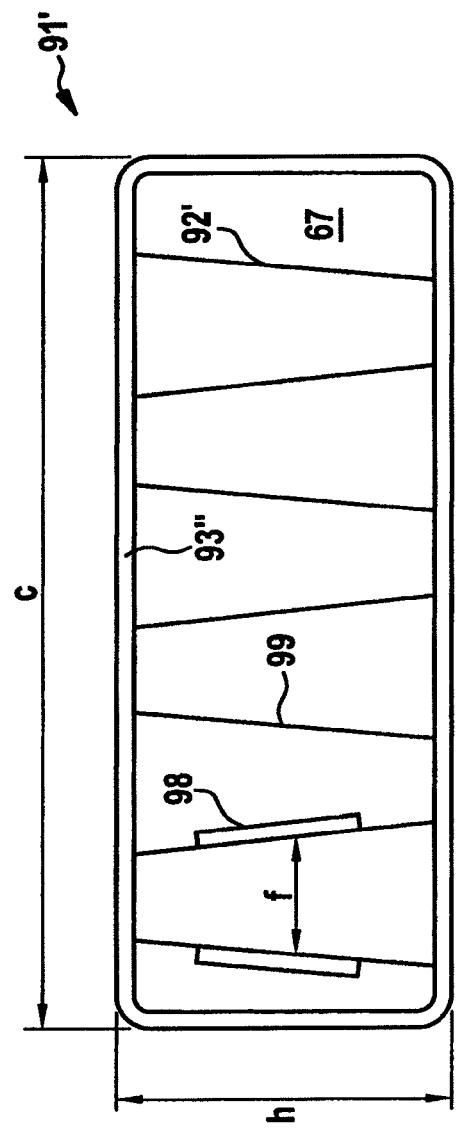
Fig. 14A
Fig. 14B

US 7,866,305 B2

FLOW CHANNEL, HEAT EXCHANGER, EXHAUST GAS RECIRCULATION SYSTEM, CHARGE AIR SUPPLY SYSTEM, USE OF A HEAT EXCHANGER

This nonprovisional application is a continuation of International Application No. PCT/EP2008/002111, which was filed on Mar. 17, 2008, and which claims priority to German Patent Application No. DE 10 2007 013 301.6, which was filed in Germany on Mar. 16, 2007, and which are both herein incorporated by reference.

BACKGROUND OF THE INVENTION

1. Field of the Invention

The present invention relates to a flow channel for a heat exchanger for heat transfer between a first fluid and a second fluid, comprising: a channel casing having an interior space surrounded by a channel casing inner surface; a number of partitions, which are arranged in the interior space of a channel casing inner surface, the flow channel which has a flow-through cross section, transverse to a flow channel axis, for guiding the first fluid in the interior space. The invention relates further to a heat exchanger for heat transfer between a first fluid and a second fluid, comprising: a block for the separate and heat-exchanging guiding of the first and second fluid, and a fluid connection for the first fluid; said block which has a housing with a chamber through which the second fluid can flow, and a block closure element for separating the chamber and the fluid connection. The invention relates further to an exhaust gas recirculation system, a charge air supply system, and a use of the heat exchanger.

2. Description of the Background Art

A flow channel for use in a heat exchanger is known German Patent Application No. DE 37 31 6 69 A1 of the applicant, and which is herein incorporated by reference.

Heat exchangers have the task of cooling a hot first fluid with the aid of a colder second fluid, so that the first fluid, particularly an exhaust gas or exhaust gas/air mixture or charge air, can be mixed into the intake air for an internal combustion machine, for example, an engine. The second fluid can be formed as a coolant, for example, a liquid or gaseous or mixed liquid-gas coolant, which at any rate in the case of a liquid coolant can be removed from the cooling circuit of the internal combustion engine. Basically, to increase the thermodynamic efficiency, the aim is cooling to as low a temperature level as possible. It is known that the concept of a cooled exhaust gas recirculation system or cooled charge air can be used to reduce pollutants, particularly nitrous oxides, in the exhaust gas.

Specifically in regard to the requirements of contemporary engines, it is possible with exhaust gas recirculating coolers to meet the continuously increasing requirements for exhaust gas pollution control. By cooling the exhaust gas and resupplying the cooled exhaust gas, the combustion temperature in the engine is reduced and leads to reduced $NO_x$ emissions. Increasing requirements for pollutant reduction have resulted in the further development of known cooler concepts and the proposal of new cooler concepts.

A flow channel in a prior-art heat exchanger can be made from a steel or stainless steel material. Here, in particular, the corrosion resistance of steel and stainless steel materials have proven valuable.

It also turned out that flow channels made from aluminum or based on an aluminum material can be made at a considerably lower cost.

To improve heat transfer in a flow channel sufficiently, a flow channel, as explained heretofore, can be typically fitted with a number of partitions arranged in an interior space on a channel casing inner surface. Basically, the number of partitions can contribute to increasing the heat transfer. With an excessive number of partitions, however, the risk rises considerably of a blockage by soot particles, which are present, for example, in the exhaust gas. It turned out that in too narrow through-passage regions in the flow channel, which are defined substantially by the flow-through cross section, a flow channel is fouled relatively rapidly and in the worst case can become partially clogged. This process as well as other measures for increasing heat transfer also increase in a contrary manner the pressure loss present in a flow channel, which is not desirable within the scope of modern heat exchanger concepts.

In addition to the design of a flow channel with an extruded channel casing as disclosed in DE 37 316 69 A1, there are other types of designs as are known, for example, from German Pat. No. DE 10 225 812 C1, German Pat. Appl. No. G 94 065 59.4, Unexamined German Pat. Appl. No. DE 36 153 00 C2, and German Utility Pat. No. DE 202 05 200 U1. However, the flow channels specified therein are intended and designed specifically for a particular application. Thus, for example, U.S. Pat. No. 5,184,672 discloses a flow channel for a heat exchanger in the form of a condenser which is fitted with flat tubes through which a liquid coolant flows. U.S. Pat. No. 3,486,489 discloses an oil cooler which is fitted with flat tubes through which oil to be cooled flows. U.S. Pat. Appl. No. 2005/0061488A1 discloses a heat exchanger which is designed for cooling oil and whose flow channels are designed for conducting the oil to be cooled. The flow-through cross section of the flow channels described therein is designed specifically for the flowing through of oil. In U.S. Pat. Appl. No. 2005/0061488A1, the flow-through cross section is characterized by a power ratio between 3.9 and 8.5, which is defined as a ratio of a wettable periphery in millimeters to a flow-through cross-sectional area of the metal tube in $mm^2$.

Such flow channels designed for guiding liquid fluids are not suitable for use in a heat exchanger of the type specified heretofore. The heat exchanger of the aforementioned type is designed in particular as an exhaust gas heat exchanger and/or charge air heat exchanger. In this case, the first fluid is gaseous or a vapor, thus, for example, an exhaust gas or an exhaust gas/air mixture or charge air. In this case, the second fluid is a coolant, in particular a liquid or gaseous or mixed liquid-gas coolant. With regard to the above-explained problems, it is desirable to realize an improved design concept for a flow channel.

SUMMARY OF THE INVENTION

It is therefore an object of the present invention to provide a flow channel which has improved heat transfer. Moreover, an acceptable pressure loss is to be attainable in particular and a risk of blockage is to be reduced in particular. It is also an object of the invention to provide an advantageous concept for heat transfer, as well as an exhaust gas recirculation system and a charge air supply system, and to provide an advantageous use of the heat exchanger.

The object related to the flow channel is achieved by a flow channel in which, according to the invention, a hydraulic diameter is provided, which can be four times the ratio of the area of the flow-through cross section to a periphery wettable by the first fluid, and can be within a range between 1.5 mm and 6 mm.

In a flow channel according to an embodiment, a certain range with respect to the hydraulic diameter should not be exceeded or undershot. The invention has recognized that for the case that the hydraulic diameter is selected, for example, as too large, a passage for the first fluid, in particular an exhaust gas or exhaust gas/air mixture or charge air, in fact should be large enough to avoid a blockage problem or significant fouling problem, or if appropriate also to keep the pressure loss low. However, for a hydraulic diameter selected as too large, heat transfer might be reduced. In the opposite case that a hydraulic diameter is selected as too small, it is possible that a flow channel does initially provide a sufficient heat transfer. In such a case, a passage in the flow-through cross section which is selected as too small, however, will become fouled rather rapidly during operation, or in the worst case become clogged, but at any rate lead to increased pressure loss. This would then lead to a considerable decrease in the heat-exchanger performance of a heat exchanger. In addition, a pressure loss might increase disproportionately in case that parts of a flow channel become excessively fouled or even clogged or blocked.

The range of a hydraulic diameter according to an embodiment of the invention has proven superior to known concepts. A flow channel according to an embodiment of the invention makes it possible to provide sufficient heat transfer in a heat exchanger and nevertheless to ensure an acceptable pressure loss with a simultaneously reduced risk of blockage.

It has also turned out that in a flow channel according to an embodiment, that a channel has an increased corrosion resistance owing to the extruded channel casing. Additional corrosion protection in a flow channel produced in this way or in some other way can also be provided. The flow channel permits an improved solution for a heat exchanger in regard to heat exchanger performance, pressure loss, and fouling, and simultaneously cost-saving use of relatively corrosion-resistant materials, in particular extruded aluminum materials.

A hydraulic diameter within a range between 2 mm and 5 mm has proven especially preferable for realizing the concept of the invention. The size of said range realizes particularly advantageously—as explained in detail with use of FIG. 5, FIG. 6, FIG. 7, and FIG. 8—a balance between the tendency to realize as good a heat transfer as possible in a flow channel, on the one hand, and the tendency, on the other, to reduce a pressure loss, or to realize an acceptable pressure loss while nevertheless realizing good heat transfer. In this connection, a hydraulic diameter within the range between 3 mm and 3.4 mm, in particular between 3.1 mm and 3.3 mm, has proven to be further particularly preferable. In particular, in regard to the latter range of a hydraulic diameter between 3.1 mm and 3.3 mm, it turned out that a hydraulic diameter of approximately 3.2 mm is especially expedient. Although it is fundamentally not possible in the stated range to prevent fouling of the flow channel, in particular of the heat exchanger tube, tests have shown, however, that in said range, fouling of the flow channel stabilizes in such a way that a decline in performance is also kept at a relatively low level. Whereas it is to be expected in ranges of the hydraulic diameter outside the aforementioned ranges that a flow channel will become increasingly fouled with an increase in pressure loss the longer it is operated, in the case of the aforementioned preferred ranges of a hydraulic diameter of demonstrated dimensions, it is to be assumed that a pressure loss stabilizes at a relatively low level. A possible suboptimal heat-transfer performance of a heat exchanger is not reduced further with continued heat exchanger operation. In the case of a hydraulic diameter outside the aforementioned ranges, in contrast, a disproportionate increase in pressure loss and ultimately in the worst case blockage of the flow channel occur during further operation of the flow channel.

A flow channel according to an embodiment of the invention can be used advantageously both within the context of high-pressure exhaust gas recirculation, explained in greater detail with reference to FIG. 1, and within the context of low-pressure exhaust gas recirculation, explained in greater detail with reference to FIG. 2. Furthermore, an application for charge air cooling is also possible. In all fields of application, in particular those stated above or the like, an increase in the number of partitions to improve heat transfer is avoided according to the concept of the invention by selecting the hydraulic diameter within a range between 1.5 mm and 6 mm. However, tests have shown that an optimized selection of a range for the hydraulic diameter can be different for low-pressure exhaust gas recirculation, high-pressure exhaust gas recirculation, or charge air cooling. In the case of high-pressure exhaust gas recirculation, as has been found, both the increase in pressure loss and the increased risk of blockage or significant fouling of a flow channel by soot particles or the like are relatively critical. For a high-pressure heat exchanger, a range of a hydraulic diameter between 2.5 mm and 4 mm, particularly between 2.8 mm and 3.8 mm, has proven particularly advantageous.

In a low-pressure exhaust gas recirculation concept, the increase in the pressure loss has proven to be especially critical, because said loss preferably should be kept especially low within the context of a low-pressure application. For a low-pressure heat exchanger, a range of a hydraulic diameter between 2 mm and 3.5 mm, in particular between 2.5 mm and 3.5 mm, has proven especially advantageous.

It has proven particularly advantageous, in particular to increase corrosion resistance, to select a ratio of a partition thickness and a channel casing thickness below a value of 1.0. In other words, to increase the corrosion resistance, it is advantageous to provide the channel casing with a greater wall thickness than a partition. This is advantageous in particular in regard to the design of a flow channel in which at least one channel casing is produced based on an aluminum material.

Furthermore, it has proven to be fundamentally relevant to optimize a channel casing thickness in such a way that, on the one hand, a sufficient corrosion resistance, in particular in the case of a flow channel based on an aluminum material, is assured and, on the other, to provide a sufficient number of flow channels in the available installation space of a heat exchanger. Installation space for a heat exchanger in an engine is usually rather limited, so that it is basically within the scope of an improvement to provide as many flow channels in a heat exchanger as possible, and therefore to design a channel casing thickness not to be too thick. According to a particularly preferred refinement of the invention, a ratio of the hydraulic diameter and a channel casing thickness within a range between 0.8 and 8 has proven to be particularly advantageous. Said range has proven to be particularly expedient in particular in a flow channel based on an aluminum material, in particular in a flow channel in which at least the channel casing is based on an aluminum material. Also advantageous is a range between 1.2 and 6.0, in particular a range between 1.4 and 6, with regard to the design of the channel casing thickness (installation space requirement, corrosion resistance) and the hydraulic diameter (heat transfer, pressure loss).

The concept of the invention and/or one or more of the aforementioned refinements individually or in combination have proven particularly advantageous for dimensions of a flow channel that realize a ratio of the periphery wettable by the first fluid and an outer periphery of the flow channel within a range between 0.1 and 0.5. The tests carried out in this regard have shown that within the range of the specified dimensions, the behavior of a flow channel is particularly advantageous in regard to the above-explained problem.

A flow channel according to an embodiment of the invention may be fundamentally realized in various forms, in particular as an extruded profile. In regard to production aspects and the aforementioned problem, a flow channel is especially expedient in which a partition as a full partition is arranged in the tube cross section at one end and on the channel casing inner surface at the other end. In particular, a tube cross section may have only full partitions. A full partition is advantageously made continuous, without openings, between a first channel casing inner surface and a second channel casing inner surface. As is explained by way of example using FIGS. 9A and 9B, this makes it possible to realize a flow channel with a hydraulic diameter according to the concept of the invention.

Furthermore, a flow channel has proven advantageous in which in the tube cross section a partition is arranged as a partial partition only at one end on the channel casing inner surface and projects freely into the interior space at the other end. As explained by way of example using FIG. 10A and FIG. 10B, as well as FIG. 11A and FIG. 11B, a hydraulic diameter may be realized in an especially advantageous manner by means of an extruded flow channel according to the concept of the invention.

It has turned out that advantageously two partial partitions can be arranged with opposing end sides at the other end. Alternatively, or in combination with the aforementioned arrangement of partial partitions, two partial partitions can be arranged with end sides offset laterally with respect to one another at the other end. It is preferable for a partial partition and a full partition to be arranged alternately next to one another.

It has proven especially advantageous to make dimensions and arrangements of the partial partitions as follows. According to an especially preferred refinement, a ratio of a distance between two partial partitions, especially two opposite partial partitions and/or two partial partitions offset with respect to one another, to a height of the tube cross section is within a range below 0.8, particularly within a range between 0.3 and 0.7. Preferably, a ratio of a distance of a first partial partition to a full partition to a distance of a second partial partition to the full partition is within a range between 0.5 and 0.9, preferably within a range between 0.6 and 0.8.

The channel casing, preferably the entire flow channel, can be made of an aluminum-based material.

Alternatively, in addition, or in combination, it can also be a material with a steel base, in particular a stainless steel base.

The channel casing may be formed as a tube, in particular as a welded and/or soldered tube or extruded tube. A flow channel may be produced, for example, from a sheet metal strip which is shaped into a tube and then welded or soldered longitudinally. Furthermore, a flow channel may also be formed by interconnected disks or plates. In particular, at least the channel casing, in particular the entire flow channel, is formed as an extruded profile.

In the case of an extruded flow channel based on an aluminum material, it has turned out that its corrosion resistance properties are comparatively good. This is to be attributed inter alia to a relatively small grain structure, conferred by the extrusion on the flow channel, and to a relatively smooth surface. This has the result that even acidic exhaust gas condensates are opposed by a corrosion resistance sufficient for the requirements of modern heat exchanger concepts.

According to an embodiment of the invention, at least one partition of the number of partitions, advantageously all partitions, can be a partition extruded with the channel casing.

According to another embodiment, at least one partition of the number of partitions, preferably all partitions, can be a partition produced separately from the channel casing and connected to the channel inner surface. A partition is preferably further formed integrally and/or molded and/or shaped. This has proven especially expedient in order to take further measures in an extruded partition to attach flow-conducting elements or turbulence-generating elements. A partition is preferably arranged parallel to a flow channel axis. It is, however, fundamentally also possible, during an extrusion process, to generate partitions running in a corrugated manner along the flow channel axis. Primarily in regard to the design of an extrusion process, it has proven expedient to make a partition continuous along a flow channel axis.

Further, a partition can be inserted, in particular pushed, into the channel casing, for example, as is disclosed in DE 37 31 669 A1.

A partition can be connected integrally to the channel inner surface. In particular, it has proven advantageous to solder, weld, and/or glue a partition to the channel inner surface. A partition produced separately from the channel casing according to the second refinement can be milled, punched, and/or rolled.

Within the context of an embodiment of the invention—particularly in regard to a refinement in which at least the channel casing, preferably the entire flow channel, can be produced based on an aluminum material—it is possible to provide at least one partition and/or the channel casing, preferably the channel casing inner surface, with corrosion protection. Corrosion protection may be provided particularly advantageously in the form of a zinc coating and/or paint.

The channel casing may be formed fundamentally in any suitable shape. The channel casing is formed particularly preferably in the shape of a tube, preferably an extruded tube. Flat tubes in particular have proven to be expedient in modern heat exchanger designs. A channel casing in the form of a tube formed by two disks joined on top of another is also suitable. A tube cross section may be selected fundamentally in numerous possible shapes—a rectangular, oval, or semi-oval tube cross section has proven particularly advantageous.

A partition may be formed as part of a profile with a corrugated, particularly rectangularly corrugated or trapezoidally corrugated cross section. The design of profiles of said type is particularly simple and has also proven to be particularly advantageous in regard to increasing heat transfer.

A number of profiles with a corrugated cross section can be arranged one behind the other along a flow channel axis—this is explained, for example, with reference to FIG. 12A and FIG. 12B and FIG. 13A and FIG. 13B.

A partition may basically have flow-conducting elements and/or turbulence-generating elements of the most diverse types, whereby the design and selection of elements of said type may be carried out according to the desired purpose and use of the flow channel. Particularly advantageous was a flow-conducting element and/or a turbulence element selected from based on: a number of interruptions and/or openings along a flow channel axis, in particular as a punched-out area, convexity, such as gills, or the like; a number of corrugations, preferably in the flow direction; and/or a number of partition openings which are offset relative to one another, in particular offset relative to one another in the flow direction, with the formation of a partition fin. Exemplary possibilities are explained with reference to FIG. 14A and FIG. 14B.

In an embodiment, a number of partitions between 2 to 20, in particular 5 to 15, in particular 7 to 12, in particular 8 to 11, and in particular 9, are arranged next to one another distributed over a tube cross section.

In regard to the heat exchanger, the object is attained by the invention by means of a heat exchanger of the aforementioned type, in which it is provided according to the invention that the block has a plurality of flow channels according to the concept of the invention, the flow channels through which the first fluid can flow, and whereby the fluid connection is fluidically connected to the flow channels. The housing preferably accommodates the flow channels.

The block closure element can be provided in the form of a base with one or more through openings for the flow channels.

Preferably, in each case, a separate inlet-side, in regard to the first fluid, and an outlet-side block closure element may be provided. This is the case in particular in a heat exchanger with the so-called I-flow design. Here, the first fluid is supplied to the heat exchanger on a first side and discharged on a second side.

In addition or alternatively, a block closure element may have an inlet region and an outlet region for the first fluid. This relates in particular to a heat exchanger with the so-called U-flow design, in which the first fluid is supplied on a first side and discharged on the same side in a different direction.

A fluid connection may preferably be formed as a diffuser, in particular an inlet diffuser and/or outlet diffuser.

The invention also provides an exhaust gas recirculation system for an internal combustion engine, comprising exhaust gas recirculation, a compressor and, according to the invention, a heat exchanger according to the concept of the invention in the form of an exhaust gas heat exchanger, in particular exhaust gas cooler.

In the exhaust gas recirculation, a distinction can be made between high-pressure recirculation, as is explained in greater detail by way of example with reference to FIG. 1, and low-pressure recirculation, as is explained in greater detail by way of example with reference to FIG. 2. In the case of high-pressure recirculation, an exhaust gas heat exchanger can be arranged on a high-pressure side, i.e., an outlet side of an internal combustion engine. In the case of low-pressure recirculation, an exhaust gas heat exchanger can be arranged on a low-pressure side of an internal combustion engine, i.e., in particular upstream on an inlet side of an internal combustion engine. In regard to said options, reference is made primarily to the aforementioned different possible design of a hydraulic diameter specifically for said options.

The invention also provides a charge air supply system for an internal combustion engine, comprising a charge air intake, an air filter, a compressor, and, according to the invention, a heat exchanger according to the concept of the invention in the form of a charge air heat exchanger, in particular a charge air cooler.

The invention also provides a use of the heat exchanger according to the concept of the invention for an internal combustion engine, in particular a diesel engine, of a motor vehicle, in particular of a utility vehicle or passenger vehicle.

The invention also provides a use of the heat exchanger according to the concept of the invention for an internal combustion engine, in particular a gasoline engine, of a motor vehicle, in particular of a passenger vehicle or utility vehicle.

The use of the concept of the invention in a two-stage heat exchanger has proven particularly preferable. The second fluid may fundamentally be a liquid coolant or a gaseous or mixed liquid-gas coolant. In an especially preferred application, the concept of the invention may be realized in a two-stage heat exchanger which is cooled in the first stage by a liquid coolant and in the second stage by a gaseous or aeriform coolant. A flow channel according to the concept of the invention may be used solely in the first stage of the heat exchanger or solely in the second stage of the heat exchanger or in both stages of the heat exchanger, and may be adapted in regard to the pressure and temperature conditions characteristic for the stages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 9A and 9B show two modifications of an embodiment of a cross section of a flow channel having an extruded channel casing and partitions extruded with the channel casing;

FIG. 14A shows a modification of the embodiment in FIG. 12A and FIG. 12B with gills as flow-conducting elements; and FIG. 14B shows a modification of the embodiment in FIG. 13A and FIG. 13B, with gills as flow-conducting elements.

DETAILED DESCRIPTION

Figure 1:
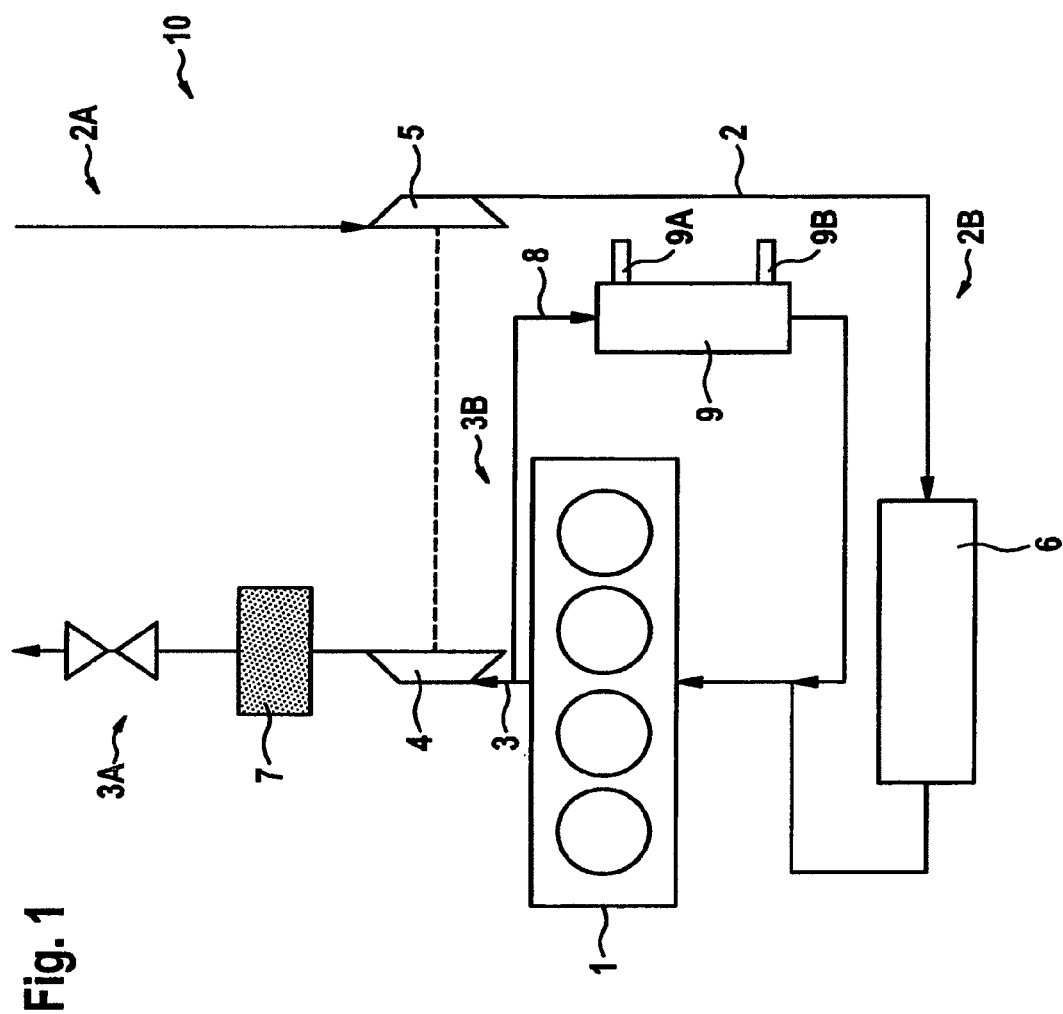
FIG. 1 shows an exhaust gas recirculation system for an internal combustion engine within the scope of high-pressure recirculation according to an embodiment.

FIG. 1 shows an exhaust gas recirculation system 10 within the scope of high-pressure recirculation for an internal combustion engine 1, which in the present case is formed as a diesel engine for a motor vehicle (not shown in greater detail). The diesel engine has an intake line 2 and an exhaust line 3, an exhaust gas turbine 4 being arranged in exhaust line 3 and a compressor 5, driven by exhaust gas turbine 4, being arranged in intake line 2 (a so-called exhaust gas turbocharger). Arranged between compressor 5 and the intake tract (not shown in greater detail) of internal combustion engine 1 is a charge air cooler 6, which can be cooled by a liquid coolant (not shown in greater detail) or, in another embodiment, also alternatively or in addition by air. An exhaust gas purification system 7, formed as a particle filter and/or oxidation catalytic converter, is provided downstream of exhaust gas turbine 4. Region 3A, situated downstream of exhaust gas turbine 4, with the symbolically depicted throttle valve, and region 2A, situated upstream of compressor 5, of intake line 2 are designated as the low-pressure side. Fresh air is taken in via region 2A, and exhaust gas is discharged into the fresh air via region 3A. Section 2B, situated downstream of compressor 5, and region 3B, situated upstream of exhaust gas turbine 4, are designated as the high-pressure side.

In the present case, in the context of the high-pressure recirculation shown in FIG. 1, an exhaust gas recirculation line 8 and an exhaust gas cooler 9 in the form of a high-pressure exhaust gas cooler are arranged between the line sections of regions 3B and 2B. The high-pressure exhaust gas cooler can be connected by means of two connecting pieces 9A, 9B to a coolant circuit (not shown in greater detail) of internal combustion engine 1.

An exemplary operation of the illustrated exhaust gas recirculation system is as follows:

Fresh air is taken in via the low-pressure line of region 2A, brought to an increased pressure—the charge pressure—by compressor 5, supplied via intake line 2 to charge air cooler 6, cooled there to increase efficiency, and supplied to internal combustion engine 1. The exhaust gases leaving the internal combustion engine drive exhaust gas turbine 4 in the high-pressure line of region 3B, which in turn drives compressor 5. Downstream of the exhaust gas turbine, the diesel exhaust gases predominantly are purified by means of exhaust gas purification system 7 and then pass via region 3A into the open air. In the high-pressure recirculation concept shown in the present case, a partial stream of exhaust gases is branched off from high-pressure line 3 in region 3B via exhaust gas recirculation line 8, cooled in exhaust gas cooler 9, and supplied to intake line 2 in regard to high-pressure section 2B, where mixing of the recirculated exhaust gases and the taken in fresh air occurs.

Figure 2:
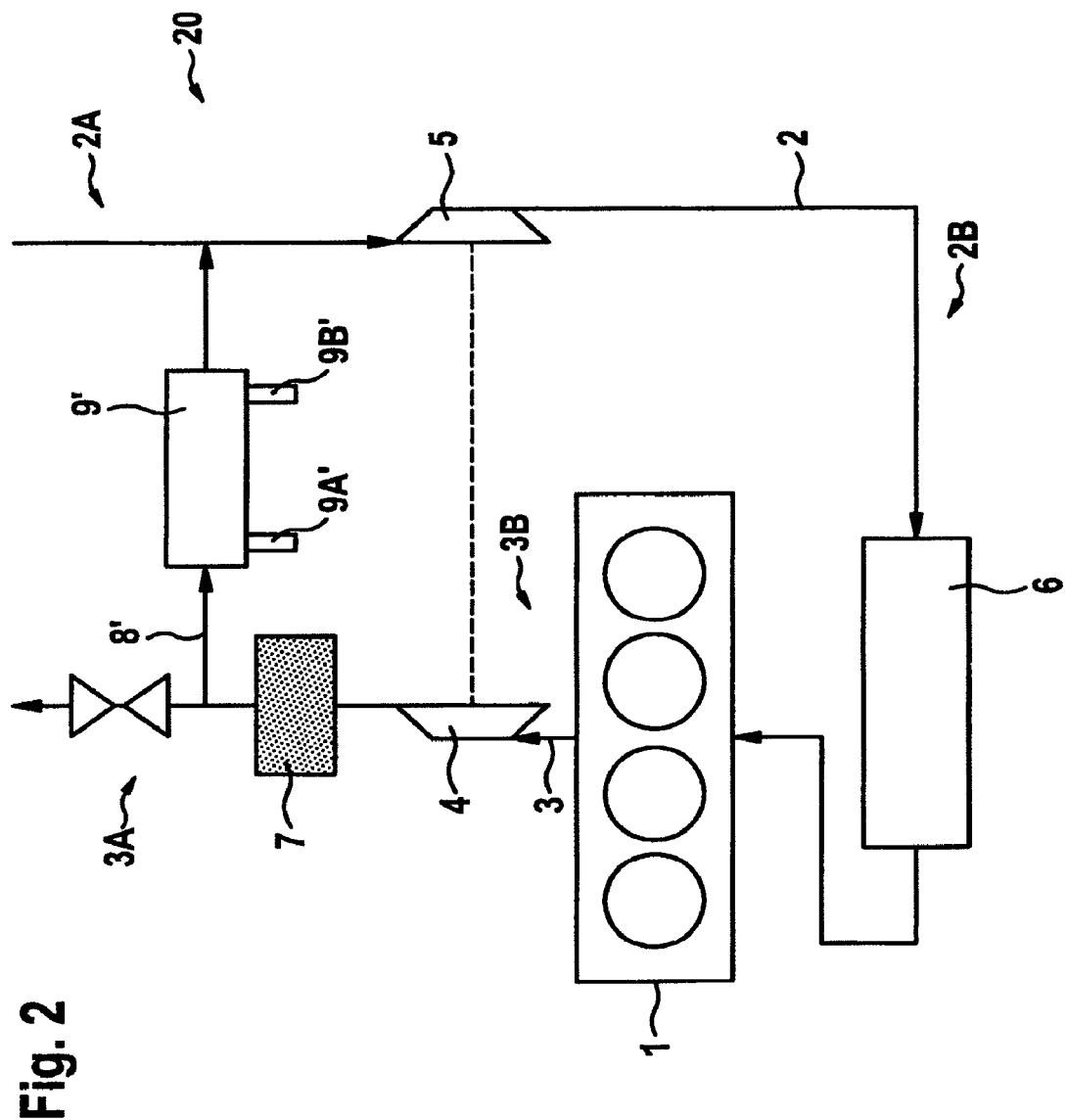
FIG. 2 shows an exhaust gas recirculation system for an internal combustion engine within the scope of low-pressure recirculation according to another embodiment.

FIG. 2 shows another embodiment of an exhaust gas recirculation system, again for an internal combustion engine 1, in which in the present case the same reference characters are used for parts corresponding to FIG. 1. Exhaust gas recirculation system 20 shown in FIG. 2 is an exhaust gas recirculation system 20 within the scope of low-pressure recirculation. Accordingly, an exhaust gas recirculation line 8' and an exhaust gas cooler 9' in the form of a low-pressure exhaust gas cooler are arranged between the low-pressure line sections of regions 3A and 2A, said exhaust gas cooler which is connected again by means of two connecting pieces 9A' and 9B' to a coolant circuit (not shown in greater detail) of internal combustion engine 1. In the present case, the performance or the pressure difference at compressor 5 is decisive for the exhaust gas quantity (mass flow) recirculated via exhaust gas cooler 9', and can therefore be increased considerably in relation to a high-pressure exhaust gas recirculation system, shown in FIG. 1, on the high-pressure side of regions 3A, 3B, in which only the pressure difference between the engine exhaust gas side and engine intake side are available for the feed flow.

Flow channels according to the concept of the invention—and particularly as described in greater detail using FIG. 9A to FIG. 14B—can basically be used both in charge air cooler 6 and in exhaust gas cooler 9, 9'. In the present case, corresponding flow channels are arranged only in exhaust gas cooler 9, 9'.

Embodiments of an exhaust gas cooler 9, 9' of said type are described in greater detail with reference to the additional FIG. 3 and FIG. 4, whereby any further form of a heat exchanger, not described in detail here, can basically be used. In particular, a two-stage heat exchanger (not shown in greater detail) may be used within the scope of high-pressure recirculation, particularly a heat exchanger, in the form of an exhaust gas cooler, which is cooled in the first stage by a liquid coolant and in a second stage by air.

In the two exhaust gas recirculation systems 10, 20 of FIG. 1 and FIG. 2, the problem arises basically that a performance increase could be achieved by means of a considerable increase in the number of partitions in a flow channel of a heat exchanger 9, 9', which, however, would come at the expense of an acceptable pressure loss and would result in an increased risk of blockage.

In particular, in the heat exchanger in the form of exhaust gas cooler 9' shown in FIG. 2, within the scope of low-pressure exhaust gas recirculation, an increase in the partition density in a flow channel would be extremely critical, because the pressure loss in exhaust gas recirculation system 20 shown in FIG. 2 is to be kept relatively low. In an exhaust gas cooler 9' within the scope of low-pressure exhaust gas recirculation—as well as in charge air cooling—there is no fouling problem in comparison with high-pressure exhaust gas recirculation, but an increased pressure loss here signifies a relatively greatly increased fuel consumption by the engine.

In exhaust gas cooler 9 shown in FIG. 1 within the scope of high-pressure exhaust gas recirculation of exhaust gas recirculation system 10, the increase in the number of partitions is associated with both a critical increase in pressure loss and the increased risk of blockage or extensive fouling by soot particles.

Figure 3:
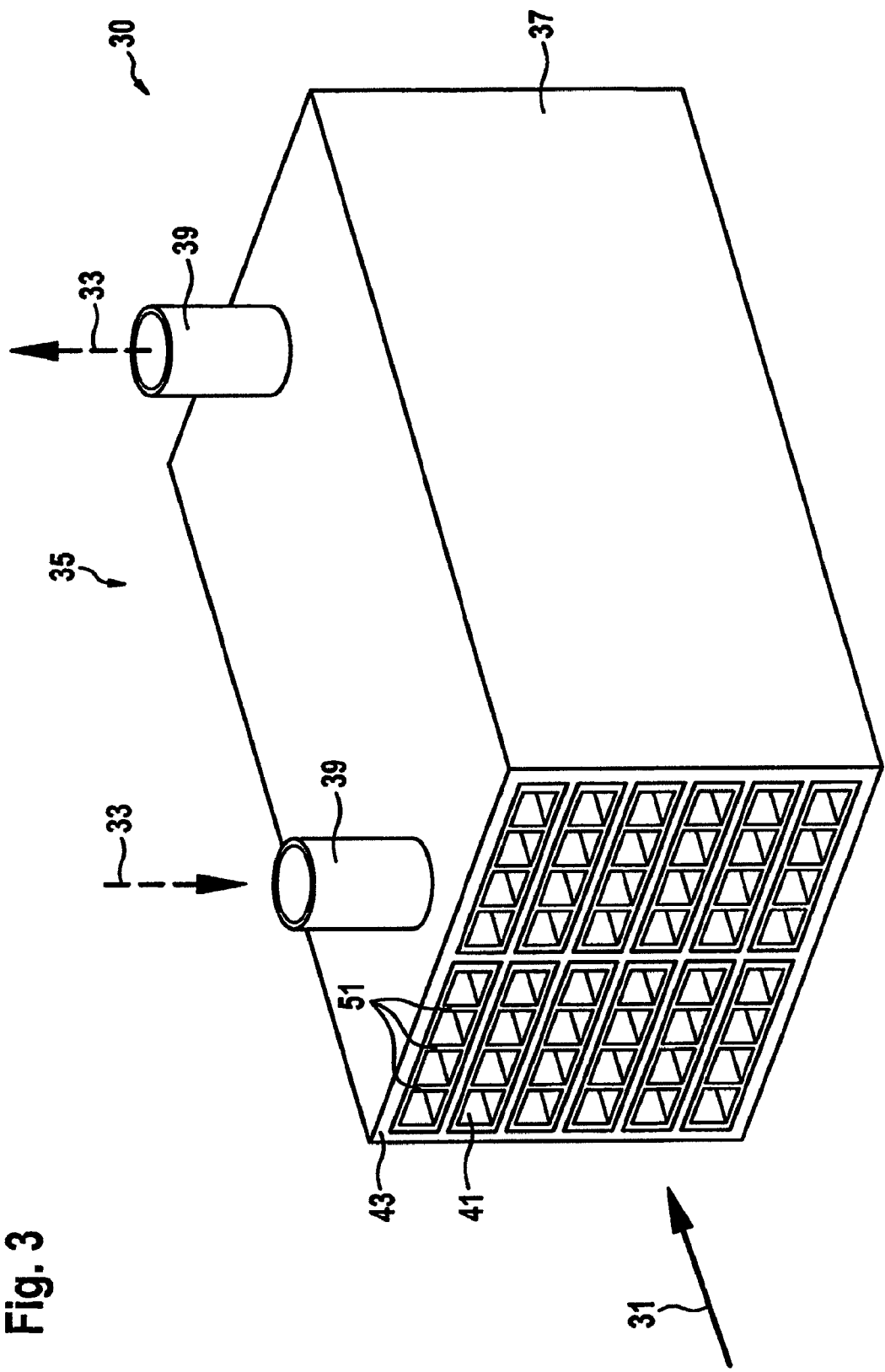
FIG. 3 shows a heat exchanger in the form of an I-flow design according to an embodiment.

FIG. 3 shows an embodiment of a heat exchanger 30, in the present case with the I-flow design, which may be used, for example, as an exhaust gas cooler 9, 9' in an exhaust gas recirculation system 10, 20 of FIG. 1 and FIG. 2. Heat exchanger 30 is designed in the present case as an exhaust gas heat exchanger for heat transfer between a first fluid 31, in the form of an exhaust gas, and a second fluid 33, in the form of a liquid coolant. Heat exchanger 30 has a block 35 which is designed for the separate and heat-exchanging guiding of the exhaust gas and of the liquid coolant and which has a fluid connection (not shown in greater detail) for the exhaust gas. Block 35 has a housing 37 with a chamber through which the liquid coolant can flow and which is not shown in greater detail in the present case. Liquid coolant 33 is supplied and discharged via coolant connections 39 as indicated by the arrow directions in FIG. 3. Block 35 has a number of flow channels 41 through which exhaust gas 31 can flow, the fluid connection (not shown in greater detail) being fluidically connected to flow channels 41. Flow channels 41 are accommodated in housing 37 and are arranged in a block closure element 43, which in the present case made in the form of a flange is provided with a plurality of through openings for flow channels 41. Block closure element 43 is used for the fluid-tight separation of the chamber (not shown in greater detail) and of the fluid connection (not shown in greater detail). During operation, liquid coolant 33 in the chamber flows around flow channels 41 and thereby cools the exhaust gas flowing in flow channels 41.

Figure 4:
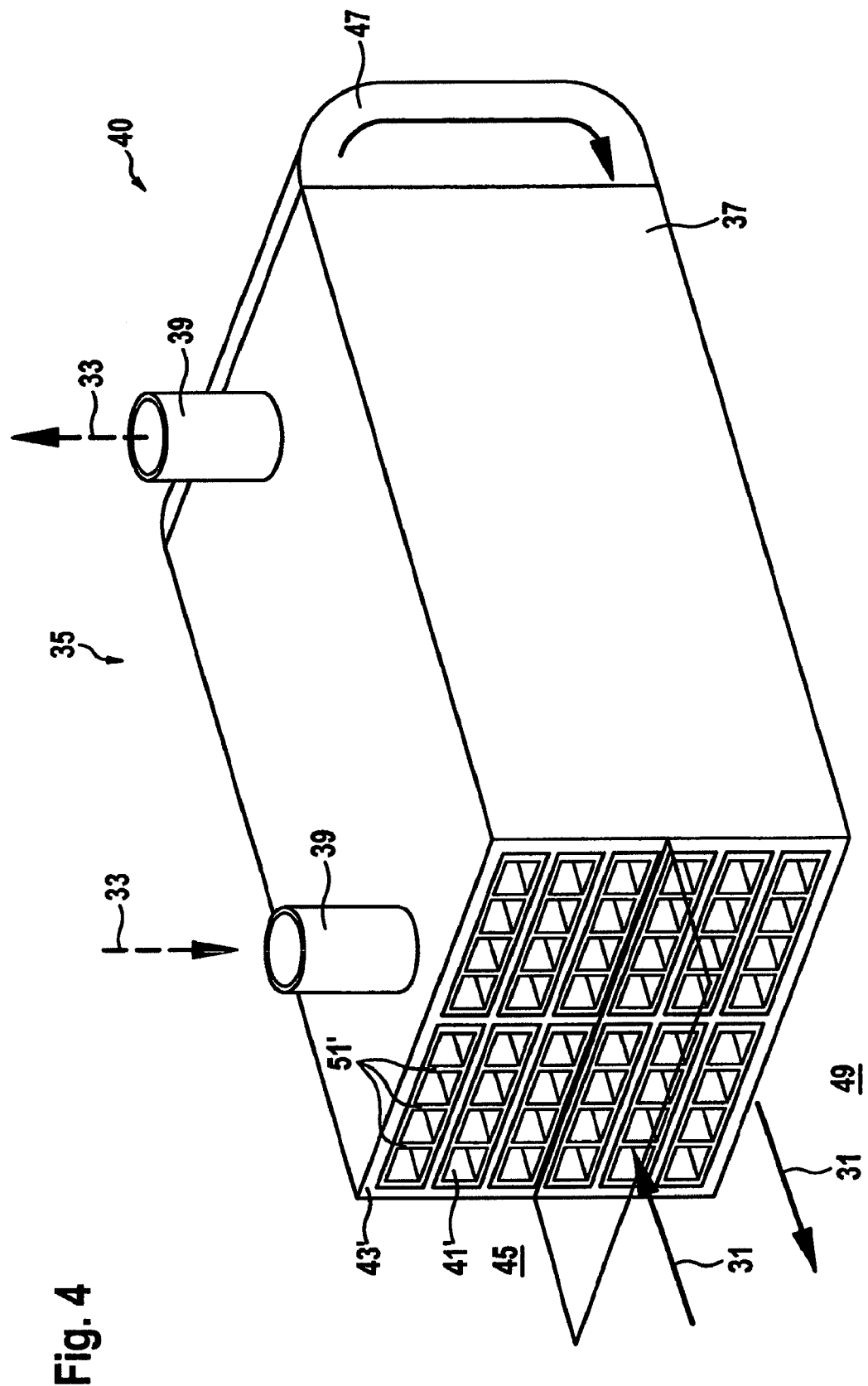
FIG. 4 shows a heat exchanger with a U-flow design according to an embodiment.

Another embodiment of a heat exchanger 40 with the so-called U-flow design is shown in FIG. 4, whereby identical parts or parts with the same function as in FIG. 3 are provided with the same reference characters.

Heat exchanger 40, with the U-flow design, in the form of an exhaust gas cooler has a deflection region 47, attached to housing 37 and arranged downstream of a first flow path 45, and a second flow path 49, arranged downstream of deflection region 47. Flow channels 41' of first flow path 45 and in second flow path 49 are continued in deflection region 47 as continuous, separate flow channels 41'; this differentiates exhaust gas heat exchanger 40 with the U-flow design shown here in FIG. 4 from conventional heat exchangers. In the latter, a bringing together of exhaust gas 31 from all flow channels 41' occurs without separation in deflection region 47.

Flow channels 41, 41', which in the present case are formed as a flat tube with three partitions 51, 51' as an extruded profile based on an aluminum material, are described in greater detail with reference to the additional figures and in the present case are shown schematically.

Figure 5:
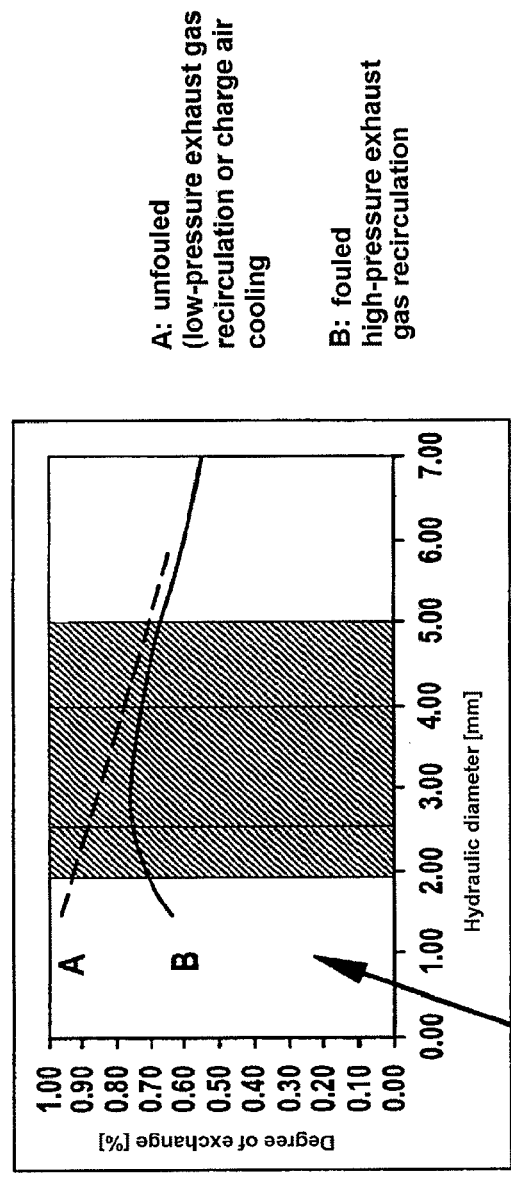
FIG. 5 shows a graph, based on measurements and calculations, of a selection of a hydraulic diameter in regard to improved heat transfer in a heat exchanger.
Figure 6:
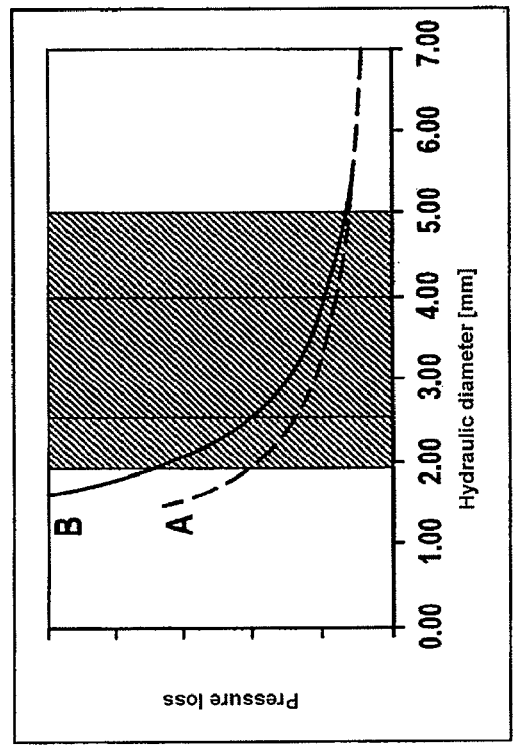
FIG. 6 shows a graph, based on measurements and calculations, of the a selection of a hydraulic diameter in regard to a pressure loss reduced as much as possible, or an acceptable pressure loss.

FIG. 5 shows the behavior of heat transfer or degree of exchange and therefore the exemplary behavior of a heat-exchanging performance of a heat exchanger using a calculation, based on measured data, for an example of a heat exchanger 30, 40 designed as an exhaust gas cooler, as shown by way of example in FIG. 3 and FIG. 4. The data are provided for typical inlet conditions, an exhaust gas pressure in the range of 1 bar having been selected for the sake of simplicity. The results, however, are also exemplary for other exhaust gas pressures. A curve A shows the behavior of a heat exchanger in the unfouled state; a curve B shows the behavior of a heat exchanger in the fouled state. FIG. 5 illustrates the degree of exchange as a function of the hydraulic diameter. FIG. 6 illustrates the behavior of a pressure loss as a function of the hydraulic diameter.

As can be seen from curve A in FIG. 5, the degree of exchange/heat transfer, definitive for heat exchanger performance, increases further with a decreasing hydraulic diameter in case the heat exchanger is not fouled. Below a hydraulic diameter of 6 mm, the degree of exchange is within an acceptable range. As can be seen from curve B in FIG. 5, the degree of exchange decreases again in an unacceptable manner below a certain hydraulic diameter in case the heat exchanger is fouled. Such a lower limit of a hydraulic diameter is 1.5 mm. The concept of the invention therefore provides that a flow channel is characterized by a hydraulic diameter, which is formed as four times the ratio of the area of the flow-through cross section to a periphery wettable by the exhaust gas and is within a range between 1.5 mm and 6 mm. The same is predefined by the pressure loss shown in greater detail in FIG. 6, which enters an acceptable range below a hydraulic diameter of 6 mm but is no longer acceptable below a hydraulic diameter of 1.5 mm. Furthermore, it is evident from the differently shaded areas in FIG. 5 and FIG. 6 that a hydraulic diameter should preferably be within a range between 2 mm and 5 mm. As shown by the darker shaded area, the upper level, which runs relatively flat, of a degree of exchange for a fouled heat exchanger is within the preferred range of a hydraulic diameter between 2.5 mm and 3.5 mm or 2.8 mm and 3.8 mm, the latter range being relevant primarily for a high-pressure heat exchanger. It turned out particularly that the degree of fouling is less relevant in a low-temperature heat exchanger based on the exhaust gas purification system 7, which is shown in FIG. 2 and connected upstream of the heat exchanger in the form of exhaust gas cooler 9', than in a high-pressure heat exchanger, which is shown in greater detail in FIG. 1 in the form of exhaust gas cooler 9 and is typically exposed to higher particle and fouling loads, as a low-temperature heat exchanger. A pressure loss as shown in FIG. 6, nevertheless, is relevant both for a low-temperature heat exchanger and a high-temperature heat exchanger.

Figure 7:
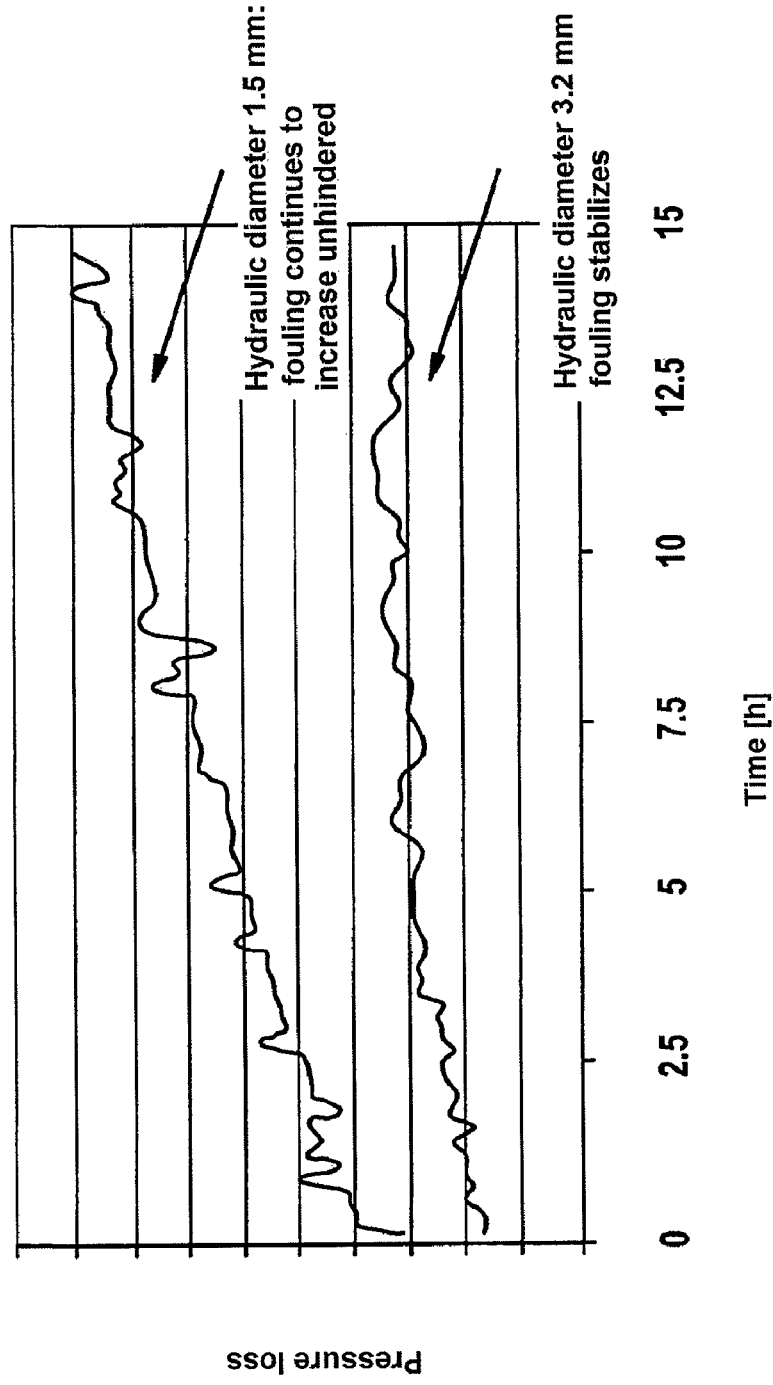
FIG. 7 shows a verification, based on measurements, of a range of a hydraulic diameter, in which stabilization of a pressure loss at a certain level is to be expected even with increasing flow channel operating time.

It is evident from the top curve in FIG. 7 that a pressure loss—illustrated in the present case using a pressure loss for a flow channel with a limit-value hydraulic diameter of 1.5 mm—increases further with increasing fouling, given as operating time in hours. In contrast, it has been found that by selecting a hydraulic diameter of 3.2 mm, likewise by selecting a hydraulic diameter within the range between 3.0 mm and 3.4 mm, preferably between 3.1 mm and 3.3 mm, the degree of fouling evidently stabilizes even with increasing operating time, such that a pressure loss stabilizes at an acceptable level.

Figure 8:
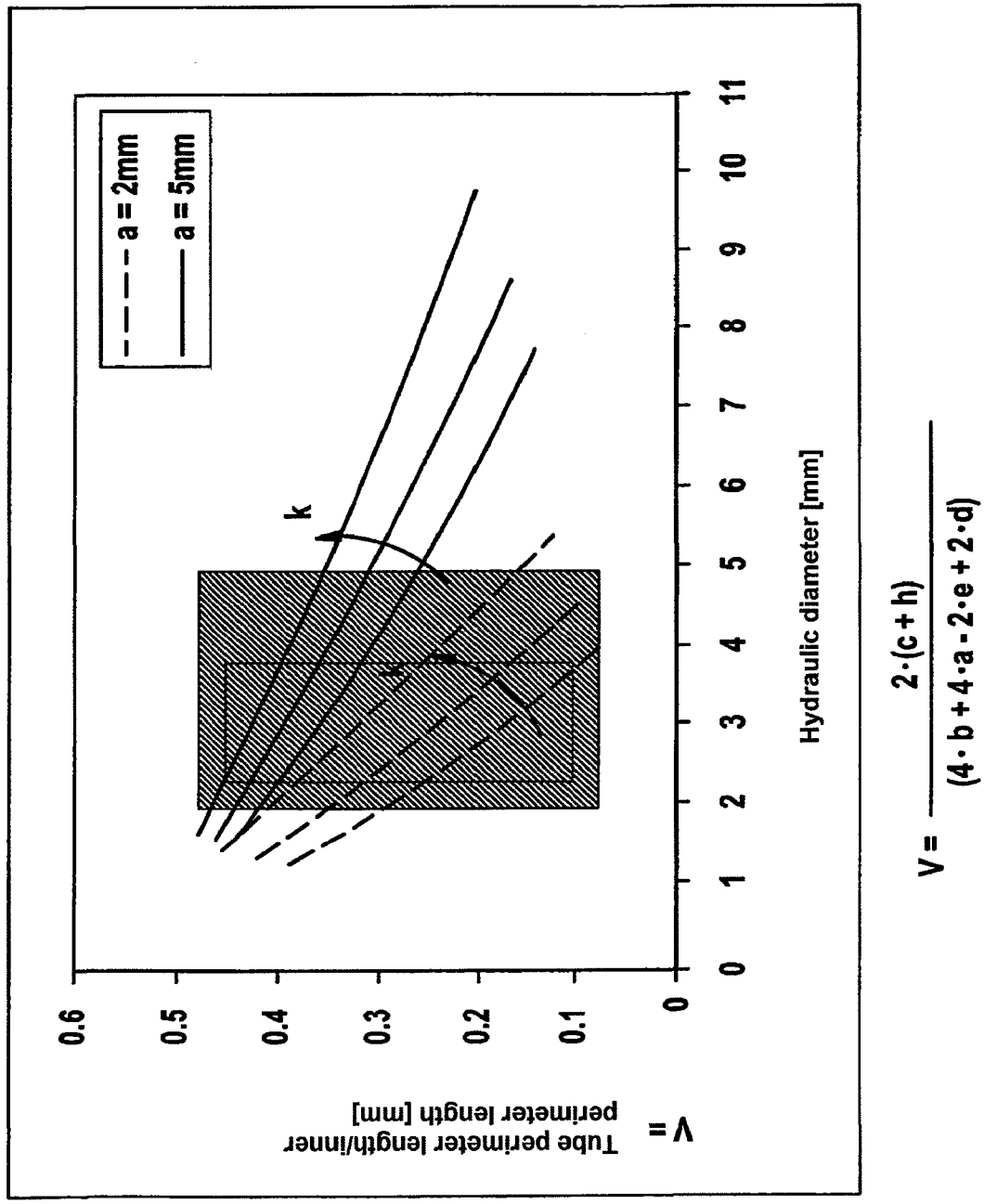
FIG. 8 shows a graph, based on measurements and calculations, of a selection of a hydraulic diameter in regard to the ratio of the periphery wettable by the first fluid and an outer periphery of the flow channel.

FIG. 8 illustrates the ratio of the periphery wettable by an exhaust gas and an outer periphery of the flow channel as a function of the hydraulic diameter. A preferred ratio results from the above-explained shaded areas of a preferred hydraulic diameter of 2 mm to 5 mm, particularly 2.8 mm to 3.8 mm. It is evident from FIG. 8 that the ratio should lie within the range between 0.1 and 0.5 in order to achieve the improved degrees of exchange and degrees of pressure loss explained in greater detail using FIG. 5 and FIG. 6. FIG. 8 in the present case is provided by way of example for a profile of a flow channel shown in greater detail in FIG. 10B. A comparable tendency can also be observed in the additional structural designs, described in greater detail hereinafter, of a flow-through cross section in a flow channel. Thus, FIG. 8 shows the explained ratio for different partition distances a, inter alia of FIG. 10B (in the present case for two examples a=2 mm and a=5 mm), and for different values of a ratio, designated here by k, of a distance between two opposite partial partitions to a height of a tube cross section. The ratio k, as illustrated in FIG. 8 by arrows, should be within a range below 0.8 mm, preferably within a range between 0.3 mm and 0.7 mm. In the present case, the ratio k of a distance e between two opposite partial partitions to a height b of the tube cross section increases from 0.25 to 0.75 in the direction of the arrow. This analysis applies both to an exhaust gas cooler 9, illustrated by way of example in FIG. 1, within the scope of a high-pressure design in an exhaust gas recirculation system 10, and to an exhaust gas cooler 9', illustrated by way of example in FIG. 2, within the scope of a low-pressure design in an exhaust gas recirculation system 20.

Exemplary structural designs of a cross section of different preferred flow channels are described hereinafter in FIG. 9A to FIG. 14B. In this case, it should nevertheless be clear that modifications of the same and any desired combination of features of the embodiments specifically described in the figures are possible, and a hydraulic diameter within the range between 1.5 mm and 6 mm, preferably between 2 mm and 5 mm, preferably between 2.8 mm and 3.8 mm, can still be achieved. In particular, the embodiments shown in the following figures each show a modification in which a channel casing thickness and a partition thickness d are identical or similar, and show another modification in which a ratio of a partition thickness d and a channel casing thickness s is less than 1.0. Accordingly, the wall thicknesses of partial partitions or similar dimensions can also be varied and adapted according to the aim to be achieved.

In particular, the figures show embodiments of flow channels as can be used in an exhaust gas recirculation system illustrated by way of example in FIG. 1 and FIG. 2 or in a heat exchanger illustrated by way of example in FIG. 3 and FIG. 4, for example, instead of flow channels 41 in heat exchanger 30 or instead of flow channels 41' in heat exchanger 40. In particular, the flow channels explained hereinafter meet all of the requirements, explained with reference to FIG. 5 to FIG. 8, for a hydraulic diameter according to the concept of the invention.

FIG. 9A and FIG. 9B show two modifications of a flow channel 61, 61'; in this case, the modifications differ in that the casing thickness s in flow channel 61', illustrated in FIG. 9B, is thicker than a partition thickness d, whereas the thicknesses are substantially identical in flow channel 61 illustrated in FIG. 9A. Furthermore, the same reference characters are used for identical features.

Flow channel 61, 61' is formed as an overall extruded profile, therefore, as an extruded channel casing together with the extruded partitions. Flow channel 61, 61' accordingly has a channel casing 63 having an interior space 67 which is surrounded by a channel casing inner surface 65 and in the present case is designed for the heat-exchanging guiding of the first fluid in the form of an exhaust gas. Furthermore, flow channel 61, 61', in the present case, has a number of five partitions 69, which are arranged in interior space 67 on channel casing inner surface 65 and are formed together with channel casing 63, 63' as an integral extruded profile. A partition 69 runs entirely parallel to a flow channel axis, which is perpendicular to the plane of the drawing, continuously along the flow path formed in housing 37 of a heat exchanger 30, 40 of FIG. 3 and FIG. 4. The shown flow-through cross section, transverse to the flow channel axis, is designed for guiding the exhaust gas in interior space 67. The design is carried out on the basis of the hydraulic diameter $d_h$, which is given for the present flow channel profile 61, 61' with reference to the distances a, b at the bottom right in FIG. 9B. The hydraulic diameter is defined as four times the ratio of the area of the flow-through cross section to a periphery wettable by the exhaust gas. The area of the flow-through cross section in the present case is a multiple of the product of a and b. The wettable periphery in the present case is likewise a multiple of twice the sum of a and b. In this case, a denotes the width of the free cross section of a flow line 74, divided in the flow channel by partitions 69, and b denotes the free height of flow line 74.

In the flow channel 63, 63', and also in the flow channels explained in greater detail hereinafter, a wall thickness s is within the range between 0.2 mm and 2 mm, preferably within the range between 0.8 mm and 1.4 mm. A height b of a flow path 74 or a height of the interior space 67 in the present case is within the range between 2.5 mm and 10 mm, preferably within the range between 4.5 mm and 7.5 mm. A width a of a flow path 74 is within the range between 3 mm and 10 mm, preferably within the range between 4 mm and 6 mm.

Figure 10A:
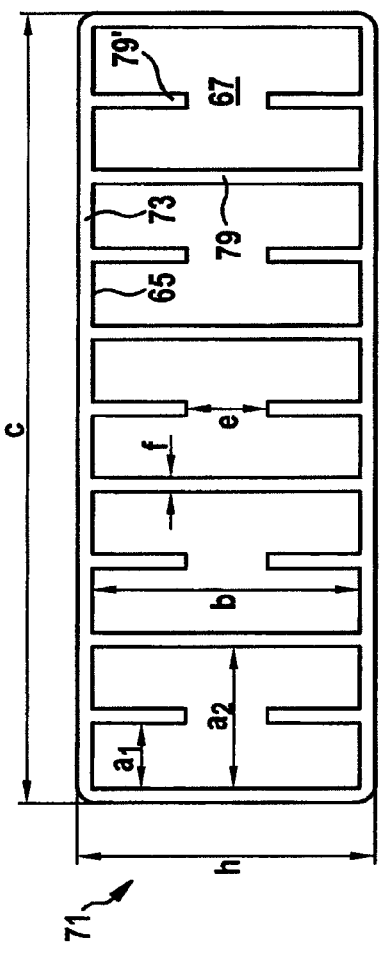
FIGS. 10A and 10B show two modifications of another embodiment as in FIG. 9A and FIG. 9B, with partial partitions.
Figure 10B:
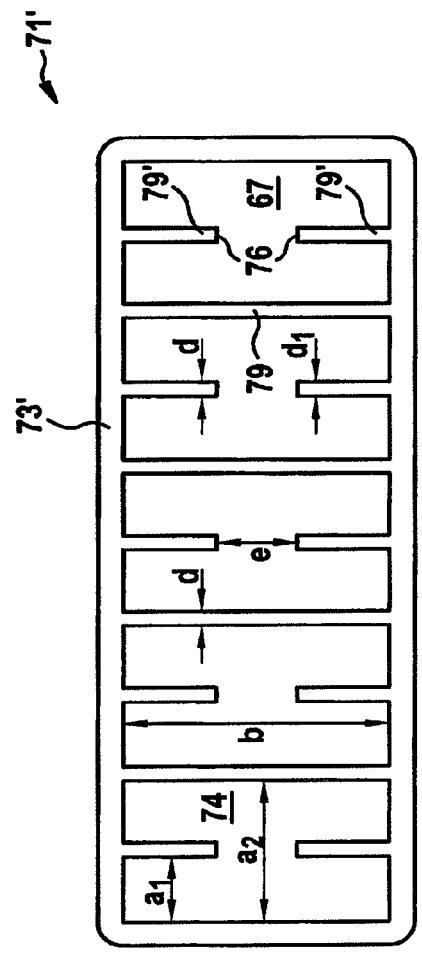

FIG. 10A and FIG. 10B show two additional modifications of an embodiment of a flow channel 71, 71', which—as explained heretofore—differ only in the wall thickness of channel casing 73, 73' relative to the wall thickness of a partition 79. Flow channel 71, 71' also has partitions 79 in the form of full partitions and partial partitions 79', arranged alternately next to full partitions 79. Flow channel 71, 71' is in turn formed entirely as an extruded profile, a flow path 74 in turn being formed by the distance between two full partitions 79. The hydraulic diameter of the flow-through cross section in flow channels 71, 71', shown in FIG. 10A and FIG. 10B, is specified below FIG. 10B. In the present case, two partial partitions 79' are each arranged with opposing end sides 76.

Figure 11A:
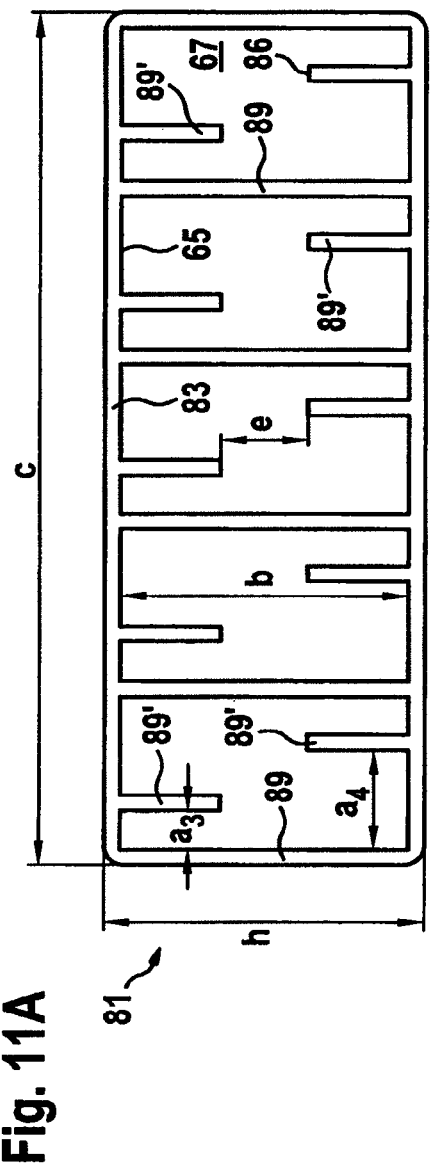
FIGS. 11A and 11B show two modifications of another embodiment as in FIG. 9A and FIG. 9B, with partial partitions.
Figure 11B:
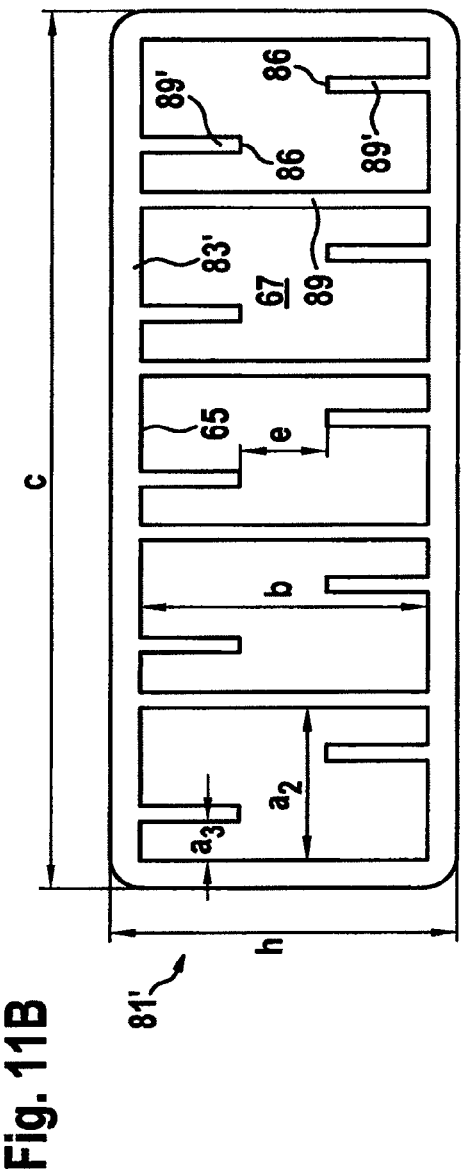

FIG. 11A and FIG. 11B show two further modifications 81, 81' of an embodiment of a flow channel 81, 81' in which two partial partitions 89' are arranged with end sides 86 laterally offset with respect to one another. A hydraulic diameter $d_h$ for the shown profile is again obtained from the formula shown below FIG. 10B, where $a_1$ is to be replaced by $a_4$.

A ratio of a distance $a_3$ of a first partial partition 89' to a full partition 89 to a spacing $a_4$ of a second partial partition 89' to the full partition 89 is within a range between 0.5 mm and 0.9 mm, preferably within a range between 0.6 mm and 0.8 mm. The distance e between two opposite partial partitions 79' and/or between two partial partitions 89', offset with respect to one another, to a height b of the tube cross section is basically within a range below 0.8 mm, in particular within a range between 0.3 mm and 0.7 mm.

Whereas the flow channels shown heretofore are formed with an extruded channel casing and partitions integrally extruded with said casing, the flow channels shown in FIG. 12A to FIG. 14B are produced as an extruded channel casing 93, 93' with a number of partitions 99, which are produced separately from channel casing 93, 93' and are connected to the channel inner surface. To this end, a profile 92, 92', illustrated using FIG. 12B to FIG. 14B, is formed with a corrugated cross section and inserted into channel casing 93, 93'— in the present case pushed in. Profile 92, 92' is then integrally connected to channel inner surface 65. The integral connection takes place in the present case by soldering profile 92, 92' to channel inner surface 65.

Figure 12A:
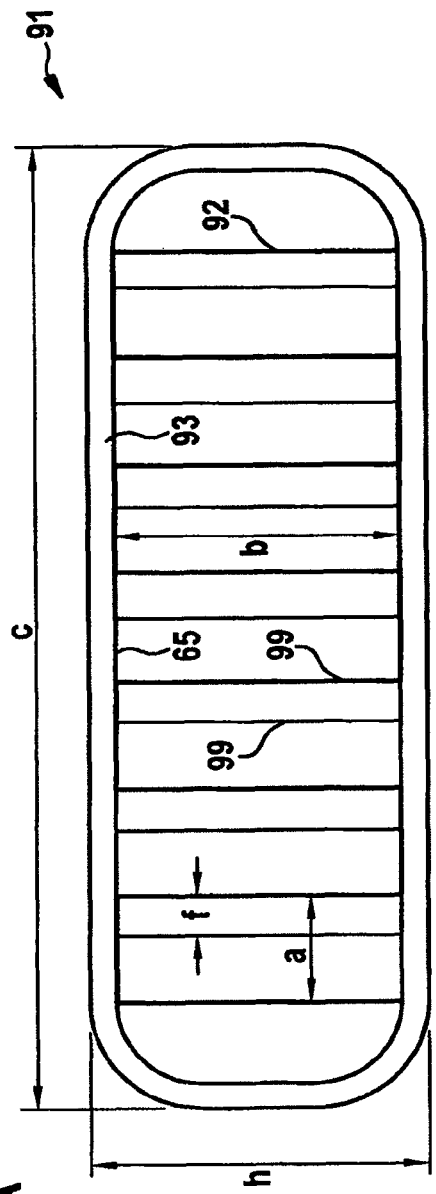
FIGS. 12A and 12B show a cross-sectional view and a plan view of an embodiment in which the partitions are produced separately from the channel casing and are connected to the channel casing inner surface.
Figure 12B:
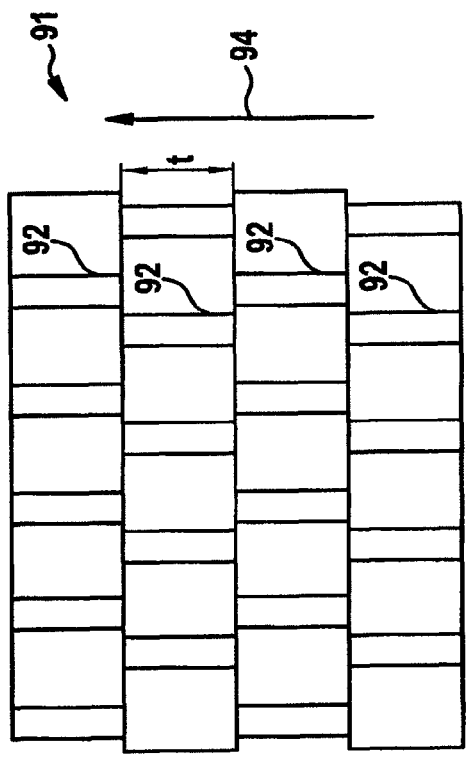
Figure 13A:
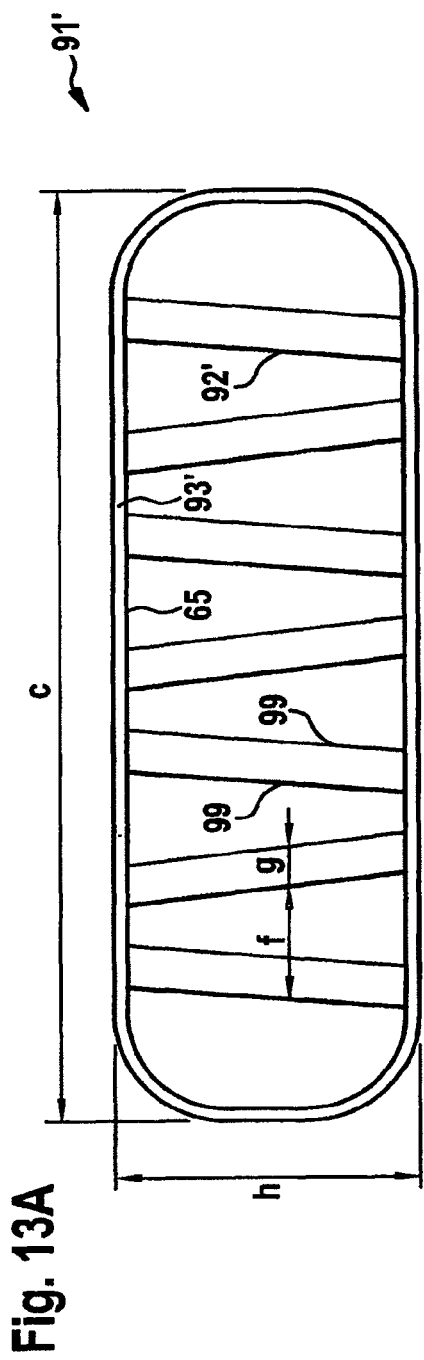
FIGS. 13A and 13B show a modification of the embodiment in FIG. 12A and FIG. 12B.

In this regard, FIG. 12A shows a cross section, and FIG. 12B a plan view detail of a flow channel 91 with a rectangularly corrugated profile 92 or trapezoidally corrugated profile 92', shown in each case pushed into a channel casing 93, as shown in FIG. 12A, or into a channel casing 93', as shown in FIG. 13A.

Figure 13B:
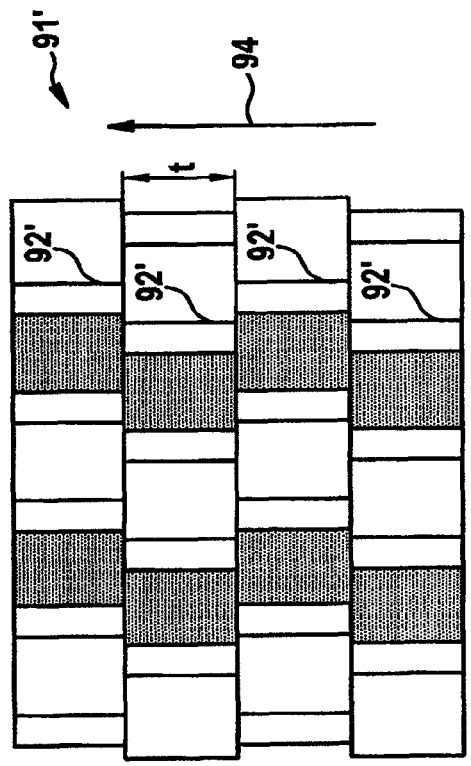

As is evident in each case in the plan view of FIG. 12B and FIG. 13B, a number of such profiles 92, 92', which are corrugated in cross section, are arranged along a flow channel axis 94 in each case in a length t and one behind the other. In this case, corrugated profiles 92, 92' are offset by a small distance with respect to one another, so that an exhaust gas flowing in the flow channel along flow channel axis 94 impinges in each case alternately the front edges of corrugated profiles 92, 92' arranged one behind the other.

An offset width f of profiles 92, 92', arranged one behind the other, is within the range between 0.1 mm and 0.8 mm, preferably within the range between 0.3 mm and 0.6 mm.

A moderate turbulence thus generated increases the heat transfer in a flow channel 91, 91' without unacceptably increasing the pressure loss. A value for a hydraulic diameter $d_h$ for the two flow channels 91, 91' of FIG. 12A and FIG. 12B, and of FIG. 13A and FIG. 13B is specified below FIG. 12A.

FIG. 14A and FIG. 14B each show a modification of a flow channel 91 with a rectangularly corrugated profile 92 or a flow channel 91' with a trapezoidally corrugated profile 92', the profiles 92, 92' being provided in a modified form additionally with a soldered gill-like fin 98. This in turn generates a moderate turbulence in interior space 67, which advantageously increases heat transfer in flow channel 91, 91' according to the modification in FIG. 14A and FIG. 14B.

In summary, the invention relates to a flow channel 41, 41', 61, 61', 71, 71', 81, 81', 91, 91' for a heat exchanger 30, 40 for heat transfer between a first fluid 31 and a second fluid 33, comprising: an extruded channel casing 63, 63', 73, 73', 83, 83', 93, 93' having an interior space 67 surrounded by a channel casing inner surface 65; a number of partitions 69, 79, 79', 89, 89', 99 arranged in interior space 67 on channel casing inner surface 65, said flow channel which has a flow-through cross section, designed for guiding first fluid 31 in the interior space and transverse to a flow channel axis 94. In order to ensure improved heat transfer with a simultaneously still acceptable pressure loss and reduced risk of blockage, a hydraulic diameter, defined as four times the ratio of the area of the flow-through cross section to a periphery wettable by the first fluid, is provided within a range between 1.5 mm and 6 mm. The invention specifies a heat exchanger which has a block with a number of flow channels of said type, through which the first fluid can flow and which are fluidically connected to a flow connection.

The invention also specifies a charge air system, an exhaust gas recirculation system, and a use of the heat exchanger.

In FIGS. 12A, 12B, 13A, 13B, and 14A and 14B, the fins have a thickness of 0.1 mm to 0.6 mm, particularly of 0.2 mm to 0.4 mm, particularly 0.2 mm to 0.3 mm.

In FIGS. 1, 2, 3, 4, 5, 6, 7, 8, 9A, 9B, 10A, 10B, 11A, 11B, 12A, 12B, 13A, 13B, 14A, and 14B, the hydraulic diameter, when the material aluminum is used, is to be formed in such a way that the partition temperature of the fin and/or the partition because of the better heat conductivity is lower than when the tube is made of steel. The fouling tendency of the aluminum exhaust gas cooler is advantageously reduced by the suitable design of the hydraulic diameter. This problem does not arise in stainless steel exhaust gas coolers, because the fin temperature is much higher, so that no tendency for fouling prevails.

In FIGS. 1, 2, 3, 4, 5, 6, 7, 8, 9A, 9B, 10A, 10B, 11A, 11B, 12A, 12B, 13A, 13B, 14A, and 14B, the following contaminations are present in the extruded materials:

Silicon: Si<1%, particularly Si<0.6%, particularly Si<0.15%

Iron: Fe<1.2%, particularly Fe<0.7%, particularly Fe<0.35%

Copper: Cu<0.5%, particularly Cu<0.2%, particularly Cu<0.1%

Chromium: Cr<0.5%, particularly 0.05%<Cr<0.25%, particularly 0.1%<Cr<0.25%

Magnesium: 0.02%<Mg<0.5%, particularly 0.05%<Mg<0.3%

Zinc: Zn<0.5%, particularly 0.05%<Zn<0.3%

Titanium: Ti<0.5%, particularly 0.05%<Ti<0.25%

For a high grain strength of the aluminum alloys, the grain sizes are measured in the section of the component in the extrusion direction as <250 μm, particularly <100 μm, particularly <50 μm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A flow channel for a heat exchanger, an exhaust gas heat exchanger or charge air heat exchanger for heat transfer between a first fluid, an exhaust gas, exhaust gas/air mixture, or charge air and a second fluid, a coolant, a liquid, or a gaseous or mixed liquid-gas coolant, the flow channel comprising:

a channel casing having an interior space surrounded by a channel casing inner surface; and a plurality of partitions arranged in the interior space on the channel casing inner surface, wherein the flow channel has a flow-through cross section, transverse to a flow channel axis, for guiding the first fluid in the interior space, and wherein a hydraulic diameter is four times the ratio of an area of the flow-through cross section to a periphery wettable by the first fluid, which is within a range between 2.8 mm and 3.8 mm.

2. The flow channel according to claim 1, wherein the hydraulic diameter is within a range between 3.0 mm and 3.4 mm, or between 3.1 mm and 3.3 mm, or is 3.2 mm.

3. The flow channel according to claim 1, wherein a ratio of the hydraulic diameter and a channel casing thickness is within a range between 0.8 and 8, within a range between 1.2 and 6, or within a range between 1.4 and 6.

4. The flow channel according to claim 1, wherein a ratio of the periphery wettable by the first fluid and an outer periphery of the flow channel is within a range between 0.1 and 0.5.

5. The flow channel according to claim 4, wherein a ratio of a partition thickness and a channel casing thickness is less than 1.0.

6. The flow channel according to claim 1, wherein a ratio of a distance of a first partial partition to a full partition to a distance of a second partial partition to the full partition is within a range between 0.5 and 0.9.

7. The flow channel according to claim 1, wherein at least one partition runs substantially parallel to a flow channel axis, or wherein at least one partition is continuous along a flow channel axis.

8. The flow channel according to claim 1, wherein at least one partition is a partition produced separately from the channel casing and a partition connected to the channel inner surface.

9. The flow channel according to claim 1, wherein at least one partition and/or the channel casing has corrosion protection, in form of a zinc coating and/or paint.

10. The flow channel according to claim 1, wherein the channel casing is configured as a tube or a flat tube, or wherein a tube cross section of the tube is configured to be rectangular, oval, or semi-oval.

11. The flow channel according to claim 1, wherein a partition configured as a full partition is arranged in a tube cross section of the tube at a first end and on the channel casing inner surface at a second such that the full partition is continuous.

12. The flow channel according to claim 1, further comprising two partial partitions being arranged in a cross section of the channel casing, the two partial partitions having first end sides offset laterally with respect to one another at a second end.

13. The flow channel according to claim 1, wherein a partition is formed as part of a profile having a corrugated, rectangularly corrugated, or trapezoidally corrugated cross section.

14. The flow channel according to claim 1, wherein a plurality of profiles with a corrugated cross section are arranged one behind the other along a flow channel axis.

15. The flow channel according to claim 1, further comprising a partition having flow-conducting elements and/or turbulence elements, wherein the flow-conducting elements and/or turbulence elements are configured as:

a plurality of interruptions and/or openings along a flow channel axis configured to form punched-out areas, convexities, and/or gills;

a plurality of corrugations; or a plurality of partition openings which are offset relative to one another or offset relative to one another in a flow direction thereby forming a partition fin.

16. The flow channel according to claim 1, wherein the hydraulic diameter is within a range between 3.0 and 3.4 mm.

17. The flow channel according to claim 1, wherein the hydraulic diameter is about 3.2 mm.

18. The flow channel according to claim 6, wherein the ratio of a distance of a first partial partition to a full partition to a distance of a second partial partition to the full partition is within a range between 0.6 and 0.8.

19. A flow channel for a heat exchanger, an exhaust gas heat exchanger or charge air heat exchanger for heat transfer between a first fluid, an exhaust gas, exhaust gas/air mixture, or charge air and a second fluid, a coolant, a liquid, or a gaseous or mixed liquid-gas coolant, the flow channel comprising:
   a channel casing having an interior space surrounded by a channel casing inner surface; and
   a plurality of partitions arranged in the interior space on the channel casing inner surface,
   wherein the flow channel has a flow-through cross section, transverse to a flow channel axis, for guiding the first fluid in the interior space, and
   wherein a hydraulic diameter is four times the ratio of an area of the flow-through cross section to a periphery wettable by the first fluid, which is within a range between 1.5 mm and 6 mm,
   wherein a ratio of a distance between two opposite partial partitions and/or partial partitions offset with respect to one another to a height of a tube cross section is within a range below 0.8.

20. The flow channel according to claim 19, wherein the ratio of a distance between two opposite partial partitions and/or partial partitions offset with respect to one another to a height of a tube cross section is within a range between 0.3 and 0.7.

21. A flow channel for a heat exchanger, an exhaust gas heat exchanger or charge air heat exchanger for heat transfer between a first fluid, an exhaust gas, exhaust gas/air mixture, or charge air and a second fluid, a coolant, a liquid, or a gaseous or mixed liquid-gas coolant, the flow channel comprising:
   a channel casing having an interior space surrounded by a channel casing inner surface; and
   a plurality of partitions arranged in the interior space on the channel casing inner surface,
   wherein the flow channel has a flow-through cross section, transverse to a flow channel axis, for guiding the first fluid in the interior space, and
   wherein a hydraulic diameter is four times the ratio of an area of the flow-through cross section to a periphery wettable by the first fluid, which is within a range between 1.5 mm and 6 mm,
   wherein a partition configured as a partial partition is arranged in a cross section of the channel casing only at a first end on the channel inner surface and projects freely into the interior space at a second end.

22. The flow channel according to claim 21, wherein two partial partitions are arranged with opposing end sides at the second end.

23. A flow channel for a heat exchanger, an exhaust gas heat exchanger or charge air heat exchanger for heat transfer between a first fluid, an exhaust gas, exhaust gas/air mixture, or charge air and a second fluid, a coolant, a liquid, or a gaseous or mixed liquid-gas coolant, the flow channel comprising:
   a channel casing having an interior space surrounded by a channel casing inner surface; and
   a plurality of partitions arranged in the interior space on the channel casing inner surface,
   wherein the flow channel has a flow-through cross section, transverse to a flow channel axis, for guiding the first fluid in the interior space, and
   wherein a hydraulic diameter is four times the ratio of an area of the flow-through cross section to a periphery wettable by the first fluid, which is within a range between 1.5 mm and 6 mm, the flow channel further comprising a partial partition and a full partition arranged alternately next to one another.

24. A heat exchanger for heat transfer between a first fluid and a second fluid, the heat exchanger comprising:
   a block for the separate and heat-exchanging guiding of the first and second fluid; and
   a fluid connector for the first fluid;
   wherein the block has a housing with a chamber through which the second fluid is configured to flow, and has a block closure element for fluid-tight separation of the chamber and the fluid connection,
   wherein the block comprises a plurality of flow channels through which the first fluid is configured to flow and the fluid connection is fluidically connected to the flow channels, the flow channels comprising:
   a channel casing having an interior space surrounded by a channel casing inner surface; and
   a plurality of partitions arranged in the interior space on the channel casing inner surface,
   wherein the flow channel has a flow-through cross section, transverse to a flow channel axis, for guiding the first fluid in the interior space, and
   wherein a hydraulic diameter is four times the ratio of an area of the flow-through cross section to a periphery wettable by the first fluid, which is within a range between 2.8 mm and 3.8 mm.

25. The heat exchanger according to claim 24, further comprising:
   an inlet-side that is separate with respect to the first fluid and an outlet-side block closure element and/or a block closure element that has an inlet region and an outlet region for the first fluid,
   wherein the block closure element is a base with one or more through openings for the flow channels, or
   wherein the fluid connector is configured as a diffuser, an inlet diffuser, and/or an outlet diffuser.

26. An exhaust gas recirculation system for an internal combustion engine, the system comprising:
   a compressor; and
   a heat exchanger configured as an exhaust gas heat exchanger or an exhaust gas cooler for heat transfer between a first fluid and a second fluid the heat exchanger comprising:
   a block for the separate and heat-exchanging guiding of the first and second fluid; and
   a fluid connector for the first fluid;
   wherein the block has a housing with a chamber through which the second fluid is configured to flow, and has a block closure element for fluid-tight separation of the chamber and the fluid connection,
   wherein the block comprises a plurality of flow channels through which the first fluid is configured to flow and the fluid connection is fluidically connected to the flow channels, the flow channels comprising:
   a channel casing having an interior space surrounded by a channel casing inner surface; and a plurality of partitions arranged in the interior space on the channel casing inner surface, wherein the flow channel has a flow-through cross section, transverse to a flow channel axis, for guiding the first fluid in the interior space, and wherein a hydraulic diameter is four times the ratio of an area of the flow-through cross section to a periphery wettable by the first fluid, which is within a range between 1.5 mm and 6 mm.

27. The exhaust gas recirculation system for an internal combustion engine according to claim 26, wherein said hydraulic diameter is within a range between 2.8 mm and 3.8 mm.

28. The exhaust gas recirculation system for an internal combustion engine according to claim 26, wherein said hydraulic diameter is within a range between 3.0 mm and 3.4 mm.

29. The exhaust gas recirculation system for an internal combustion engine according to claim 26, wherein said hydraulic diameter is within a range between 3.1 mm and 3.3 mm.

30. The exhaust gas recirculation system for an internal combustion engine according to claim 26, wherein said hydraulic diameter is about 3.2 mm.

31. The exhaust gas recirculation system for an internal combustion engine according to claim 26, wherein a partial partition is arranged in a cross section of the channel and projects into the interior space casing with a first end on the channel inner surface and a second end spaced from the channel inner surface.

32. The exhaust gas recirculation system for an internal combustion engine according to claim 26, further comprising a partial partition and a full partition arranged alternately next to one another.

* * * * *